UNITED STATES PATENT OFFICE.

ALFRED J. HUET, OF PARIS, FRANCE.

TREATMENT OF ANIMAL AND VEGETABLE SUBSTANCES FOR THE MANUFACTURE OF FERTILIZERS, &c.

SPECIFICATION forming part of Letters Patent No. 242,777, dated June 14, 1881.

Application filed November 26, 1880. (No specimens.)

*To all whom it may concern:*

Be it known that I, ALFRED JEAN HUET, of Paris, in the Republic of France, have invented certain new and useful Improvements in Preserving and Disinfecting Animal and Vegetable Substances for the Manufacture of Manure, and for other Purposes, of which the following specification is a full description.

The invention relates particularly to the treatment of fecal matters for making manure, but has reference also to the preservation of anatomical specimens, to the disinfecting of rendering establishments, sewers, stagnant waters, and the dead bodies of diseased animals, and to similar preservative and disinfecting purposes.

The object of the present invention is, first, to prevent animal and vegetable matters from putrefying and giving off the gases generated by putrefaction, and thus to do away with the fetid odors resulting from decomposition; second, to separate and destroy the insects and animal and vegetable germs which are produced in bodies in a state of fermentation, and, being disseminated, carry their ravages everywhere, and especially among growing crops; third, to destroy the putrid or noxious germs which constitute the main cause of a large number of epidemic diseases; fourth, to make, by the treatment of the matters indicated, a very strong manure, which can, by the addition of the substances chosen, according to the special circumstances, be made applicable to every kind of culture, and which will effectually defend the article under cultivation from the attacks of parasites. These results are attained readily and economically by the application, as hereinafter set forth, of the following materials, to wit: first, a solution or magma of lava, obtained by treatment of lava with acid; second, what may be called "empyreumatic lime," resulting from the oxidation of the heavy oils of tar in connection with lime; and, third, alunite (alum-stone) or alumi- nite calcined in presence of chloride of potassium.

All the lavas with the bases of alumina, lime, and potash can be satisfactorily used; but for agricultural purposes preference is given to lavas rich in potash, such as those called "leu- citic"—that is to say, those containing crystals of leucite which give more than twenty per cent. of potash. The other principal elements which compose these lavas are silica, alumina, lime, iron, magnesia, and a small quantity of phosphorus. These lavas, being broken or granulated and subjected to the action of sulphuric acid diluted to about 40° Baumé, produce a solution which contains sulphate of alumina, alum, ferrous and ferric sulphate, soluble silica, phosphoric acid, and also an insoluble residue specially rich in potash and alumina. This residue, if acted upon at a temperature of 600° centigrade with bisulphate of potash, yields—in small quantities, it is true—the above-mentioned products, but also much alum. This solution is what is called herein "solution of lava." If, instead of proceeding to act upon the lava by sulphuric acid, it is treated with hydrochloric acid at only 12° Baumé, the reaction will be very energetic, the operation taking place at ordinary temperatures, and a more complete decomposition of the lava will be effected than with sulphuric acid. The result of this treatment is a mass or magma pulpy and gelatinous by reason of the silica set free and not dissolved, and containing the following components: chloride of aluminium, chloride of iron, chloride of magnesium, phosphoric acid, soluble silica, gelatinous silica, and finally, as a residue, some crystals of leucite or amphigene. By filtering this pulp, after being sufficiently agitated, the residue is separated, and the filtrate obtained will contain all the soluble salts heretofore enumerated, which are very deliquescent. This liquid is also a solution of lava, and the magma or pulpy mass from which it is obtained is called herein "magma of lava."

In order to overcome the deliquescent property of the salts mentioned in cases where this would be injurious for the purposes for which it is to be employed, a certain quantity of calcined alunite can be added.

For the preparation of these products no special apparatus is necessary. Crushers of any suitable system can be employed for pulverizing the lavas, and tanks with agitators constructed of wood or other material not affected by acids will answer to mix the crushed or granulated lavas with acids.

The preparation of empyreumatic lime is effected by oxidation of heavy oils of tar by the action of atmospheric agents, with the addition of hydrate of lime.

No particular description of the calcination of alunite with chloride of potassium is deemed necessary, as the manner of proceeding will be readily understood by those familiar with processes of roasting and calcining minerals.

I shall now proceed to describe the manner in which these products can be industrially applied.

*Treatment of fecal matters for disinfecting the same and for manufacture of manure therefrom.*—It is well known that these matters always contain a certain proportion of ammoniacal salts. To retain these salts, which contain nitrogen—the principal fertilizing material—about one to two per cent. of ordinary crude sulphuric acid is first introduced into the mass. The proportion will be varied according to the state of the material, and can be readily ascertained in any case by experimental tests. The mass is mixed in any suitable mixing apparatus, and then about five kilograms, at the maximum, of the magma of lava is introduced for each kilogram of fecal matter in the mass already incorporated with the sulphuric acid. Continuing the operation of the mixer, the fecal matter will in about ten minutes have lost for all time its infectious odor. The operation is then completed by introducing into the mixer one kilogram of heavy oil of tar or resin, or, what is still better, empyreumatic lime. The mass is allowed to remain about twenty-four hours in order that the reaction may be complete. To obtain from this material a complete manure destructive of insect life, phosphate of lime in powder and a small quantity of alunite calcined in presence of chloride of potassium are added. The phosphate of lime both improves the character of the manure by its presence, and also neutralizes any acid which remains in excess. The several ingredients are of course to be thoroughly incorporated. The manure thus obtained is as rich in nitrogen as the fecal matters employed, is rich in potash, contains phosphoric acid in a soluble state, is deadly to insects, and is inodorous. It should be dried or desiccated to remove excess of liquid, using any suitable process. If, however, heat is employed, care should be taken that it does not rise above 200° centigrade. This desiccation is accomplished without emitting any gas or noxious or disagreeable odor, and the powder obtained is inodorous and always imputrescible, so that it can be stored under the ordinary conditions of commerce. Fermentation henceforth will take place very slowly and little by little under the influence of natural agents in the soil on which it is employed as a fertilizer, as a powerful stimulant to the growth of vegetation, and as an active insecticide. In practice the magma of lava can be employed in the cesspool itself by introducing it at the moment of clearing; but it would be better to introduce it continuously by small quantities, which allows the reagent to fall drop by drop into the pool. This can be readily effected, and it is deemed unnecessary to state herein its advantages, as they are evident. The agricultural importance of the product can be increased by adding, according to the needs of the special circumstances, those agents which are deemed necessary—as, for example, soluble phosphates, bone-dust, baked scraps of leather, and the like, and by increasing or diminishing the proportion of empyreumatic lime or calcined alunite.

I will now proceed to describe other applications of the preserving and disinfecting agents before enumerated.

*Preservation of flesh and other animal matters.*—In order to insure the preservation of a fragment of flesh of an animal or a piece of fish, it suffices to steep it in a solution of lava such as before indicated for some hours, or when the object is of sufficient size the solution can be injected. The fragment becomes incorruptible, being thoroughly tanned and rapidly hardened; but as the solution of lava contains a small quantity of chloride of aluminium, free and deliquescent, the specimen should, in order to obviate this difficulty, be plunged into a solution of carbonate of ammonia, potash, or soda. When dried the specimen can be preserved indefinitely. This application of the solution of lava can be utilized by anatomists and scientists, and in certain cases by the medical and legal professions, when, for the sake of evidence, it is necessary to preserve portions of animal matter.

*Disinfecting of rendering and other establishments deleterious to the health of their vicinity.*— In establishments where the remains of animals are subjected to operations which have as an object the extraction from them of useful material, the decomposition and emission of unhealthy odors can be avoided by introducing a small per cent. of the solution of lava into the boilers in which the remains are treated, the proportion depending upon the materials themselves. The remains can also be soaked in the lava solution before being operated upon, as the greasy matters are not altered by the action of the lava solution or magma.

*Disinfection of water of sewers and stagnant pools and similar liquids.*—To immediately destroy fermentable elements it suffices to introduce into the liquids two to three per cent. of the solution of lava. This agent coagulates almost instantaneously all soluble and insoluble organic materials. The solution or magma of lava can be employed with equal advantage in hospitals, barracks, and similar institutions where there is a large production of infectious liquids. As in the case of sewer-waters, the introduction of the lava solution or magma produces a precipitate without appreciable odor, which constitutes a manure of the first quality, and being very rich in potash, it is valuable for application to grape-vines. The liquid remains limpid, is more or less colored, and has an acid reaction. The acidity can be readily removed by the addition of lime or other suitable agent.

*Disinfection of dead bodies of diseased animals.*—The treatment with the solution of lava of the bodies of animals which have died of disease, after the same have been cut up, enables them to be buried without fear of subsequent injurious effects, as all contagious or infectious germs will have been destroyed. The result will be more complete if care is taken to sprinkle on the body a little alunite calcined with chloride of potassium and a little empyreumatic lime.

The examples heretofore given will suffice for the understanding of the principles of the invention and the manner of applying them. Instead of lava and alunite, other minerals having similar composition could be used.

The agents mentioned can be employed separately or combined or mixed with other materials, according to the circumstances of the case.

Having now fully described the said invention and the manner of carrying the same into effect, what I claim, and desire to secure by Letters Patent, is—

1. The described preservative and disinfectant agents, being a solution or magma of lava resulting from treating lava with acid, alunite calcined with chloride of potassium, and lime mixed with oxidized oil of tar, substantially as set forth.

2. In preserving and disinfecting animal and vegetable matters, that step or method for preventing putrefaction and destroying infectious and other germs consisting in subjecting the material to the action of a solution or magma of lava obtained by treating lava with acid, substantially as described.

3. The method of treating animal and vegetable matter for making manure and for other purposes by subjecting the same to the action of a solution or magma of lava, and also to that of alunite calcined with chloride of potassium, and tarry substance, such as the empyreumatic lime described, all substantially as set forth.

This specification signed this 5th day of November, 1880.

ALFRED JEAN HUET.

Witnesses:
EUG. DUBREIL,
AUG. PARISOT.